United States Patent Office 3,419,376
Patented Dec. 31, 1968

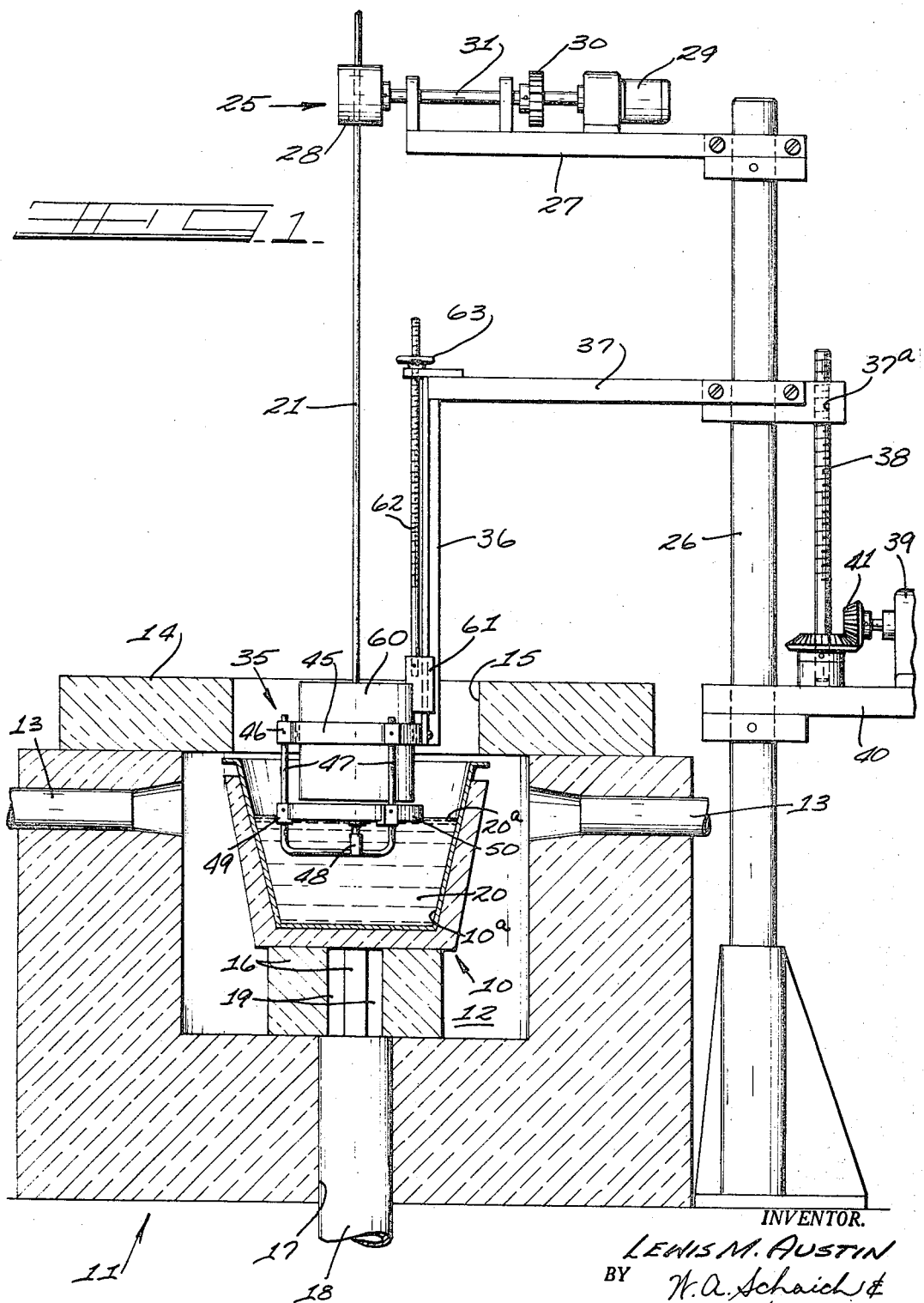

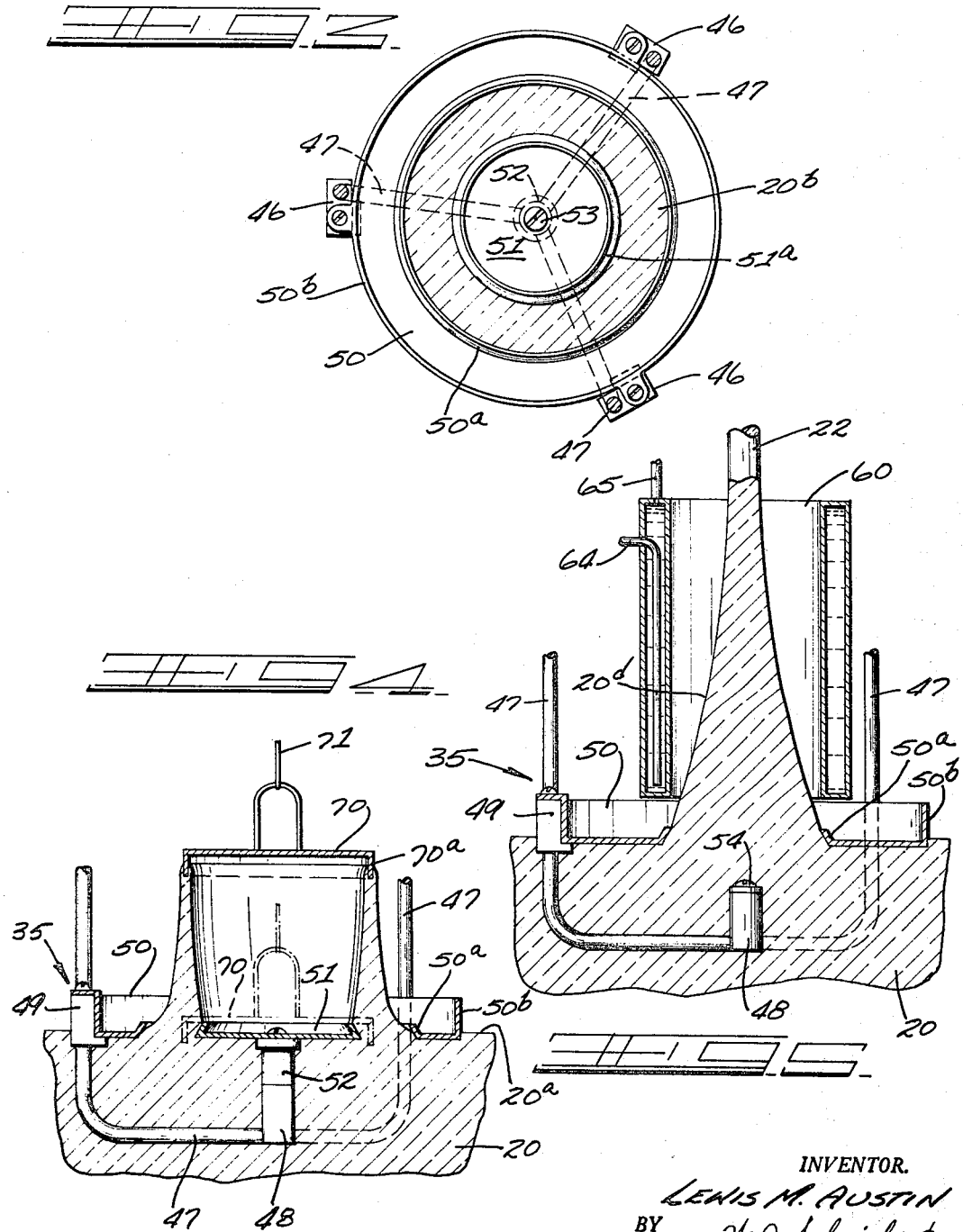

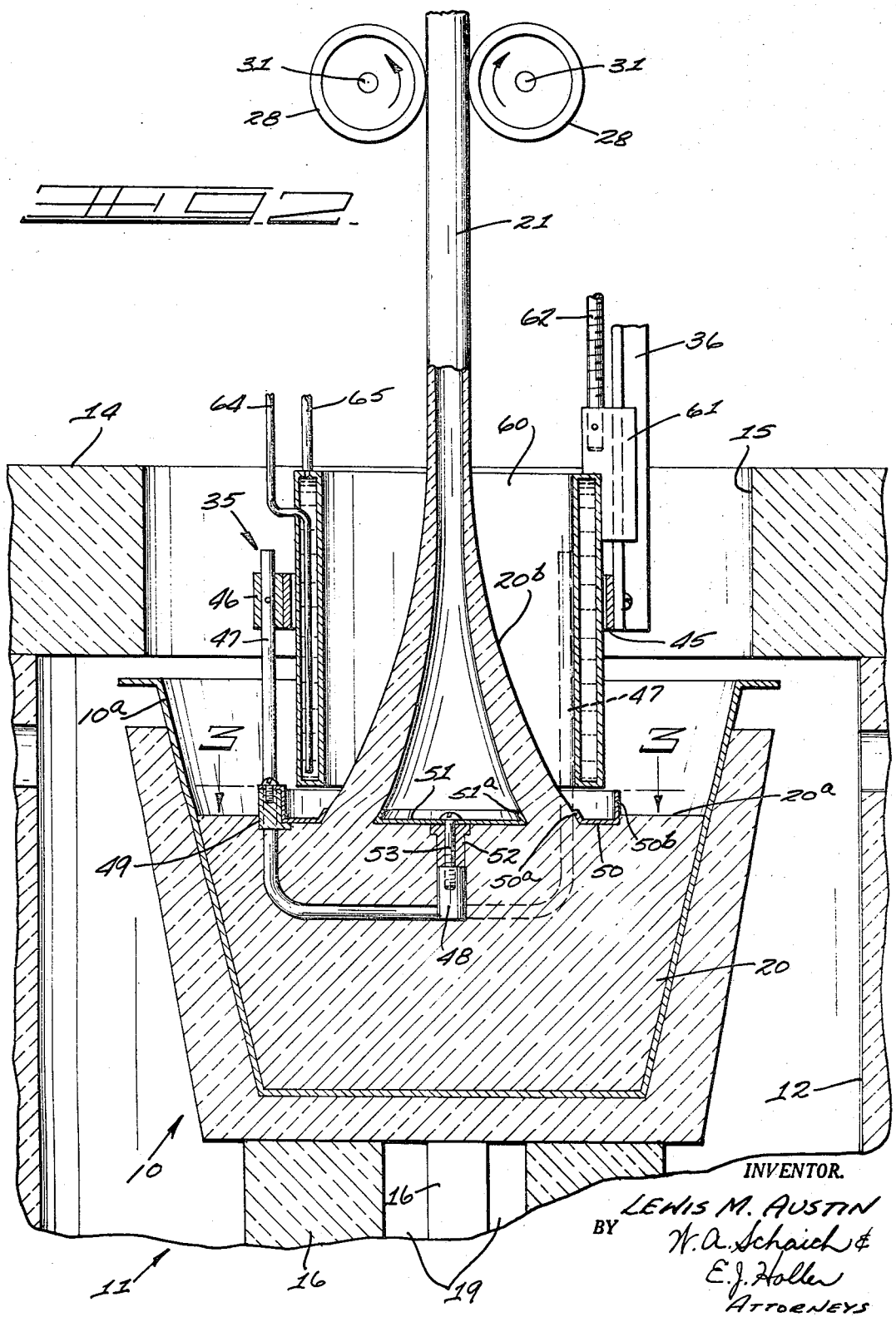

3,419,376
APPARATUS FOR PRODUCING GLASS ROD
AND TUBING
Lewis M. Austin, Toledo, Ohio, assignor to Owens-Illinois,
Inc., a corporation of Ohio
Continuation of applications Ser. No. 105,404, Apr. 25,
1961, and Ser. No. 418,383, Dec. 8, 1964. This application Jan. 6, 1967, Ser. No. 613,713
2 Claims. (Cl. 65—192)

ABSTRACT OF THE DISCLOSURE

This invention relates to improved apparatus for continuously drawing molten glass in cylindrical form such as tubing or rod by an updrawing process, the apparatus being capable of operation fully independently of the molten glass containing receptacle. The glass-contacting surfaces of the apparatus are comprised of noble metal.

---

This application is a continuation of my earlier-filed applications, Ser. No. 105,404, filed Apr. 25, 1961, and Ser. No. 418,383, filed Dec. 8, 1964, both assigned to the same assignee as the present application and now abandoned.

Previously in various updrawing processes it has been conventional practice to provide a hollow nipple immersed below the surface of the molten glass disposed in and comprising a part of the molten glass container such as a basin or forehearth to introduce blowing air into the root of drawn glass tubing, and means by which the glass may be drawn from above the nipple. Such means usually comprises an annular shaping sleeve immersed in the glass above the nipple and disposed in alignment therewith through which the draw takes place so that drawn tubing, for example, is controlled essentially by the shape of the shaping sleeve and regulation of the blowing air. Many variations of such drawing processes and equipment have been employed previously, all of which require modifying the chamber of container from which the cylindrical product is drawn.

Accordingly, a primary object of this invention is to provide an improved process and apparatus for continuously drawing glass in cylindrical or other form in an expedient, economical and continuous manner whereby the output is materialy increased and substantial savings in expense and labor are effected over conventional methods and apparatus utilized previously.

Another object of the invention is the rapid and accurate production of varied amounts of glass tubing or rod from a bath of molten glass provided by a wide range of sources.

Another object of the invention is the provision of shaping apparatus and processes for continuously forming glass tubing and rod or cane by providing access to an exposed surface of molten glass and shaping the glass product by an updrawn process operable independently of the glass containing vessel.

A further object of the present invention is to provide improved apparatus for upwardly drawing various sizes of glass tubing and rod by introducing such apparatus into a bath of molten glass from above and maintaining the same in constant vertical relation to the glass surface.

A still further object of this invention is to provide an improved method of updrawing glass tubing and rod from an exposed surface of molten glass by an independent shaping device comprised essentially of noble metal having integrally connected cone and lenser portions.

The above and other objects are capable of attainment by employing my invention which embodies among its features drawing glass upwardly through a conditioning and shaping device which is partially submerged below the surface of a pool of molten glass and which device is comprised of essentially noble metal components consisting of interconnected cone and lenser portions having horizontal surfaces disposed generally coextensive with the glass surface. The subject apparatus and method of updrawing are utilizable fully independently of the molten glass container.

The specific nature of this invention, as well as other objects and advantages thereof, will become apparent to those skilled in the art from the following detailed description taken in conjunction with the annexed sheets of drawings on which, by way of preferred example only, are illustrated the preferred embodiments of this invention.

In the accompanying drawings:

FIG. 1 is a side elevational view partially in vertical section through a tube drawing pot embodying one form of the present invention;

FIG. 2 is an enlarged vertical sectional view of the tube drawing apparatus shown in FIG. 1;

FIG. 3 is a transverse sectional view taken along the line 3—3 of FIG. 2 at the root area of tubing drawn from apparatus constructed in accordance with FIGS. 1 and 2;

FIG. 4 is an enlarged vertical sectional view of initiating the tube drawing operation; and FIG. 5 is a view similar to FIG. 4 illustrating a rod drawing operation.

Referring to FIG. 1 of the drawings in detail, a drawing pot 10 is mounted within a suitable melting furnace 11. Drawing pot 10 is preferably circular in shape and has a continuous inner lining 10a comprised of noble metal such as platinum or platinum-rhodium alloy.

Furnace 11 has a circular interior chamber 12 within which drawing pot 10 is centrally mounted. A plurality of inwardly-directed radial burners 13 adapted to heat the molten glass contained in the drawing pot is mounted in the furnace sidewalls. Furnace 11 is provided with an annular top block 14 having a circular opening 15. The bottom of the furnace is provided with a series of spaced-apart support blocks 16 surrounding an axial opening 17 having an exhaust tube 18 mounted therein to remove burner combustion gases from the furnace.

Relatively large opening 17 disposed in the furnace bottom is located in axial alignment with surrounding pot support blocks 16 with a plurality of intermediate openings 19 interconnecting furnace chamber 12 and exhaust tube 18. Burners 13 are preferably of the radiant gas-fired type capable of obtaining temperatures in the furnace chamber in the range of from 1300° to 3000° F. Exhaust tube 18 in the furnace bottom serves as a flue and leads to an exhaust stack to reduce updraft and convection currents directly above the furnace. A suitable eductor (not shown) is preferably employed in combination with tube 18 to control and maintain the flow of exhaust gases from the furnace.

It is to be understood that the above-described furnace is simply one means of preparing the bath of molten glass 20 in refined and homogeneous condition with its surface exposed for drawing operations. The molten glass may similarly be retained in other types of crucibles, delivery forehearths, feeder bowls or small tanks from which a lengthy cylindrical glass product is capable of being drawn in accordance with the present invention.

A tractor mechanism 25 is supported above pot 10 by a vertical column 26 disposed adjacent to furnace 11. Drawing mechanism 25 is mounted on a horizontal arm 27 positioned at the upper end of vertical column 26. Mechanism 25 comprises a cooperating pair of similar rotatable rolls 28 which are driven in any suitable manner and at a desired speed of rotation by an electric motor 29, for example, through a pair of gear wheels 30 and drive shafts 31. Two rolls 28 are preferably mounted in tandem in the same horizontal plane adapted to draw tubing 21 upwardly therebetween. Other suitable drawing mechanisms known in the art can be similarly employed.

Drawing assembly 35 is mounted over pot 10 on the lower end of a vertically-disposed arm member 36 which is rigidly attached to the cantilevered free end of a vertically-movable horizontal arm 37. Arm 37 is slidably mounted on vertical column 26 and has a threaded opening 37a therein with a rotatable screw-threaded shaft 38 passing therethrough to facilitate controlled vertical movement of the drawing assembly. A second electric motor 39 is stationarily mounted on a horizontal support plate 40 adapted to drive a set of bevel gears 41 one of which is keyed to rotary shaft 38 to raise or lower the drawing assembly 35 through vertical movement of arms 36 and 37. Normally the aforesaid driving mechanism serves to lower the drawing assembly 35 at a controlled rate to maintain the drawing assembly and glass surface 20a in constant relation.

Drawing assembly 35 consists of an annular ring 45 disposed in a horizontal plane rigidly attached to the lower end of vertical arm 36. Ring 45 has three spaced-apart blocks 46 rigidly attached exteriorly with vertical openings therein to receive and retain three similarly-spaced vertical arms 47 which extend downwardly. Arms 47 interconnect in a lower central region to comprise a spider-like arrangement for retaining the glass shaping members in proximity to the glass surface 20a. The three arm members 47 extend downwardly a substantial distance and have horizontally inwardly directed portions which intersect at a central vertically-arranged post 48 which extends upwardly from their point of connection. Each of the arms 47 has a retention block 49 affixed to an intermediate vertical portion to retain a shaping ring member 50 in proximity to the glass surface.

Ring 50 is positioned in generally coextensive relation with respect to the glass surface and comprises a lenser to shape the exterior surfaces of the glass product as drawn. Ring 50 has a short vertical extent and cylindrical edges, the interior of which terminate in an upwardly and inwardly directed annular flange 50a. Ring 50 is firmly affixed in a horizontal plane to the series of retention blocks 49 mounted on the vertical portions of arm members 47. The exterior peripheral edge of ring 50 has a vertical cylindrical flange 50b to permit introduction of the ring or lenser into the glass surface to a variable degree to control thickness of the product, for example. Inner flange 50a is contoured to provide a shaping surface for the exterior of the glass product as drawn whether the product be rod or tubing.

A circular plate member 51 as shown in FIG. 2 is mounted centrally within ring or lenser 50 supported by a sleeve member 52 and a machine screw 53 which interconnects with rigid central post 48. Plate or disc 51 has an upwardly and inwardly directed peripheral flange 51a which serves to shape the inner surface of a tubular glass product as drawn. Thus, it is readily apparent that cone and lenser members 51 and 50 have extensive horizontal surfaces with juxtaposed upwardly directed flanges 51a and 50a respectively which provide an open annulus through which cylindrical glass tubing is drawn. The spider-like arrangement of arm members 47 extends substantially below the surface of the molten glass a sufficient distance to avoid conflict or interference with drawing of the molten glass and to minimize the development of objectionable characteristics in the drawn product. Cone, lenser and connecting arm members and all portions of drawing assembly 35 which are immersed in the glass are preferably fabricated of heat and corrosion resistant noble metal or alloy such as platinum or platinum-rhodium alloy.

A cooling sleeve 60 consisting of a hollow cylindrical jacket is mounted immediately above annular ring 50 in coaxial alignment therewith. Sleeve 60 is mounted independently of and within ring 45 supported by a slidable support block 61 which is vertically operable on rigid arm 36. Support block 61 has a screw-threaded shaft 62 attached thereto which extends upwardly parallel to arm 36. A threaded adjustment knob 63 on the upper end of shaft 62 operates in conjunction with an extension of horizontal arm 37 to control the relative disposition of the cooling jacket 60 with respect to other working elements of the drawing assembly. Sleeve 60 is provided with inlet and outlet lines 64 and 65 respectively adapted to supply a continuous stream of cooling water internally of its inner chamber. Cooling jacket 60 is normally positioned to surround the root area 20b of the drawn product in order to condition and initiate solidification of the drawn product into final form.

FIG. 2 illustrates the relative disposition of the shaping surfaces of cone and lenser portions 51 and 50 respectively which are interconnected by the radially and upwardly-extending arm members 47. Arms 47 are shown essentially fully immersed and extending to a substantial depth within the molten glass below the cone and lenser members. The depth of immersion of arms 47 within the molten glass is governed by the relative vertical location of the cone and lenser members which have their horizontal surfaces preferably disposed in the same horizontal plane. The relative coaxial and vertical locations of the cone and lenser may be slightly varied as desired.

FIG. 3 illustrates in a horizontal sectional view the root area 20b of the tubular glass product 21 as drawn. It is readily observed how the cylindrical glass product is drawn upwardly between the oppositely-disposed inwardly and upwardly flared edges 50a and 51a of the lenser and cone members. These edges provide smooth shaping surfaces for departure of the molten glass as drawn.

FIG. 4 illustrates one embodiment of the procedure for initiating drawing of a tubular glass product. A bait 70 is positioned over and in contact with cone member 51 when the drawing assembly 35 is lowered into contact with the molten glass surface. When the molten glass contacts the downwardly extending annular flange 70a of bait 70 with cone and lenser members 51 and 50 properly positioned in proximity to glass surface 20a, the bait is raised by a connecting line or wire 71 so that adhering glass will follow and subsequently be engaged by tractor device 25. Withdrawal of the glass through the lenser 50 and around the cone 51 causes additional glass to flow into and around the region from which the glass is displaced and arm members 47 do not retard such flow. Thus, the open annulus between the shaping members called the cone-to-lenser opening is continuously supplied with fresh glass from the mass therebelow to provide completely homogeneous and refined molten glass to the drawing apparatus to fabricate a high-quality uniform product. As the glass is drawn upwardly under the influence of the tractor, sections of desired length are severed and ambient air enters the tubular product from the open end of the column. It has been found in fabricating a wide range of sizes utilizing different combinations of cone and lenser members that no blowing air is required and inherent variables in the darwing process are primarily governed by the molten glass temperature, disposition of cone and lenser members with respect to the glass surface and the drawing rate.

The use of ambient air internally of the tubular product as drawn is preferred to shape the tubing in practicing the present method. The column of quiescent atmospheric air exerts a uniform pressure on the internal surfaces of the glass product in the root area so that by maintaining a constant rate of pull upwardly on a solidified region of the tubular product the root area is uniformly acted upon by all factors affecting tube formation. Actually ambient air surrounds the glass tube or rod from the root to a point where the product emanates from the furnace. It is readily apparent that at least one arm member 47, post 48 and cone 51 may be hollow and connected to a source of blowing air to introduce the same into the root area 20b as desired or required.

In the production of a rod-like product 22 as shown in FIG. 5 cone 51 and its supporting sleeve 52 are eliminated from the drawing mechanism 35 prior to its introduction into the glass. A machine screw 54 is employed to cap center post 48 and only the lenser member 50 is utilized to form the rod or cane. Initiation of rod drawing is effected in a manner generally similar to that shown in FIG. 4 and the rod is drawn upwardly through the tractor device into a uniform product. The root area 20d of the product is essentially solid and the exterior surfaces are shaped primarily by the opening provided by lenser flange 50a and the rate of drawing. The horizontal surface of the lenser is maintained in essentially constant relation with the glass level to form the uniform rod-like product.

The present method may be summarized as follows:

Raw batch or cullet is placed within the melting pot and reduced to a liquid state by heating. Melting temperatures in the range of 2200° to 3000° F. are employed for most common glasses to keep the melting and refining time to a minimum so that individual batches can be melted, stirred, fined and cooled to allow rod or tubing to be drawn the same day. Obviously, some glasses require longer melting and refining periods. The glass is then cooled to the proper drawing temperature, taking proper safeguards to prevent the formation of a crust of viscous glass on the surface of the melt. Glass temperature is observed at the center of the melt, preferably with an optical pyrometer, and when approximately 100° F. above the starting temperature, the lenser is placed on the surface of the glass at the center of the pot. The surrounding water cooler is then mounted and lowered until the spacer legs (not shown) on its bottom just contact the lenser. The spacer legs are adjusted so that a short space exists between the bottom of the water cooler and the lenser.

The following procedure is utilized in tube drawing of glasses not particularly susceptible to devitrification. After the prescribed drawing assembly is mounted in proper relation to the glass level at the proper drawing temperature, the starting bait is raised very gradually and the assembly lowering device is started at a prescribed rate to maintain the cone and lenser at the glass level as the tubular product is drawn upwardly. The furnace is adjusted to maintain the glass temperature within the prescribed working range. The drawing rollers and a guide are aligned so that the tubing is drawn perpendicular to the assembly cone and lenser. Other variables are adjusted to produce the desired tube dimensions. The cone member of the drawing assembly is utilized to form the inside cavity of the tubing. The distance between the cone outside diameter and the lenser inside diameter from which the glass is drawn provided a cone-to-lenser opening to form tubing of prescribed dimensions. The lowering device is continuously operated during the drawing cycle for its maintainance in constant relation to the glass level. As the lower extremities of the arms 47 approach or contact the crucible bottom the cycle is ended. When a stream of glass is delivered into the drawing vessel such as a forehearth or feeder the lowering device may of may not be operated as required to achieve the above-described conditions.

The following procedure is utilized in rod drawing of glasses not particularly susceptible to devitrification. After the drawing assembly and water cooler are lowered and mounted in prescribed relation with the glass having temperature approximately 20° F. above the starting temperature the bait which is preheated is inserted into the glass at the center of the lenser opening prependicular to the glass surface and retained in this position until adherence of the glass is obtained. The bait is then withdrawn upwardly from the lenser at a very slow rate forming a glass rod which is drawn upwardly a sufficient distance to be essentially solidified. The bait is cracked off and the assembly lowering device is started and adjusted to maintain the lenser and water cooler in proper relation to the glass level. The glass rod is then further drawn upwardly between the drawing rollers and the drawing rate is adjusted to product rod of the proper outside diameter. The furnace burners are adjusted to maintain the glass reservoir at the proper working temperature and other variables are adjusted to produce the desired size rod.

Various modifications may be restorted to within the spirit and scope of the appended claims.

I claim:

1. In an apparatus for drawing a glass tube from a body of molten glass, the combination comprising
   a container for retaining a body of molten glass,
   a hollow integral glass shaping device supported independently of and projecting downwardly into said container adapted to extend at least partially below the surface of the body of molten glass,
   said shaping device being comprised of noble metal forming surfaces and having a generally annular cross-sectional configuration consisting of a circular flat cone and die portions integrally joined by a plurlity of interconnecting arm members,
   said cone and die portions adapted to be disposed adjacent the glass surface with said arm members adapted to project downwardly substantially below the surface of the glass,
   cooling means mounted above and integral with said shaping device,
   means for drawing glass upwardly through said shaping device and said cooling means,
   means interconnecting said cooling means and said shaping device,
   and means for vertically moving said shaping device and said cooling means downwardly with respect to said container to maintain said shaping device in prescribed relation with respect to the glass surface.

2. In an apparatus for drawing a tubular glass product, the combination comprising
   a container for retaining a bath of molten glass,
   a hollow integral glass shaping device supported independently of said container projecting downwardly into said container and adapted to extend at least partially below the surface of the body of molten glass,
   said shaping device having a generally annular cross-sectional configuration consisting of substantially flat circular cone and die portions providing a circular open annulus integrally joined by a plurality of interconnecting arm members,
   said cone and die portions having relatively flat undersurfaces and upstanding juxtaposed annular flanges adapted to be disposed closely adjacent the glass surface with said arm members adapted to project downwardly substantially below the surface of the glass,
   cooling means mounted above and in vertical alignment with said shaping device,
   means for drawing glass upwardly through said shaping device and said cooling means,
   and means interconnecting said shaping device and said cooling means so that they are movable upwardly and downwardly in unison with respect to said container to maintain said shaping device in prescribed relation with the glass surface.

References Cited

UNITED STATES PATENTS

| | | | |
|---|---|---|---|
| 717,378 | 12/1902 | Fourcault | 65—338 |
| 1,273,346 | 7/1918 | Fagan | 65—344 |
| 2,085,245 | 6/1937 | Woods | 65—338 |

S. LEON BASHORE, *Primary Examiner.*

FRANK W. MIGA, *Assistant Examiner.*

U.S. Cl. X.R.

65—86, 338, 344, 348